(12) United States Patent
Xie et al.

(10) Patent No.: US 11,284,364 B2
(45) Date of Patent: Mar. 22, 2022

(54) PREDETERMINED MASTER INFORMATION BLOCK CODING

(71) Applicant: ZTE CORPORATION, Guangdong (CN)

(72) Inventors: Saijin Xie, Guangdong (CN); Focai Peng, Guangdong (CN); Mengzhu Chen, Guangdong (CN); Jun Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 60 days.

(21) Appl. No.: 16/871,630

(22) Filed: May 11, 2020

(65) Prior Publication Data
US 2020/0314779 A1 Oct. 1, 2020

Related U.S. Application Data

(63) Continuation of application No. PCT/CN2017/111749, filed on Nov. 17, 2017.

(51) Int. Cl.
*H04W 56/00* (2009.01)
*H04L 1/00* (2006.01)
*H04L 5/00* (2006.01)
*H04L 69/324* (2022.01)
*H04W 72/00* (2009.01)
*H04W 72/04* (2009.01)

(52) U.S. Cl.
CPC ......... *H04W 56/001* (2013.01); *H04L 1/0057* (2013.01); *H04L 1/0071* (2013.01); *H04L 5/0007* (2013.01); *H04L 69/324* (2013.01); *H04W 72/005* (2013.01); *H04W 72/042* (2013.01); *H04L 1/0042* (2013.01)

(58) Field of Classification Search
CPC ... H04W 56/00; H04W 56/001; H04W 72/00; H04W 72/005; H04W 72/04; H04W 72/042; H04W 72/0406; H04L 5/0005; H04L 5/0007; H04L 1/0056; H04L 1/0071; H04L 69/30; H04L 69/32; H04L 69/324; H04L 1/0041; H04L 1/0042
See application file for complete search history.

(56) References Cited

U.S. PATENT DOCUMENTS

2012/0327895 A1* 12/2012 Wallen ................. H04W 48/12
370/330
2014/0031031 A1* 1/2014 Gauvreau ............ H04L 5/0053
455/426.1

(Continued)

FOREIGN PATENT DOCUMENTS

| CN | 104219767 A | 12/2014 |
|---|---|---|
| CN | 106465144 A | 2/2017 |

*Primary Examiner* — Warner Wong
(74) *Attorney, Agent, or Firm* — Duane Morris LLP

(57) ABSTRACT

A system and method for coding master information blocks (MIBs) for broadcast are disclosed herein. In one embodiment, a method performed by a communication node includes: identifying time sensitive bits among a master information block; placing the time sensitive bits at predetermined encoding positions, wherein the time sensitive bits at the predetermined encoding positions are encoded with a common property different than other bits of the master information block; encoding the master information block; and transmitting a broadcast message comprising the master information block.

18 Claims, 6 Drawing Sheets

(56) References Cited

U.S. PATENT DOCUMENTS

| | | | |
|---|---|---|---|
| 2014/0169272 A1* | 6/2014 | Shieh | H04W 4/38 370/328 |
| 2015/0124741 A1* | 5/2015 | Shieh | H04L 1/0013 370/329 |
| 2017/0105166 A1 | 4/2017 | Lee et al. | |
| 2017/0187488 A1 | 6/2017 | Rico Alvarino et al. | |
| 2018/0123849 A1* | 5/2018 | Si | H04J 11/0073 |
| 2018/0324017 A1* | 11/2018 | Liu | H04L 5/0053 |
| 2019/0007896 A1* | 1/2019 | Ye | H04L 5/0053 |
| 2020/0007163 A1* | 1/2020 | Huangfu | H03M 13/3944 |
| 2020/0205136 A1* | 6/2020 | Nazar | H04W 72/0446 |
| 2021/0203361 A1* | 7/2021 | Noh | H04L 1/0061 |
| 2021/0266866 A1* | 8/2021 | Basu Mallick | H04W 48/12 |

* cited by examiner

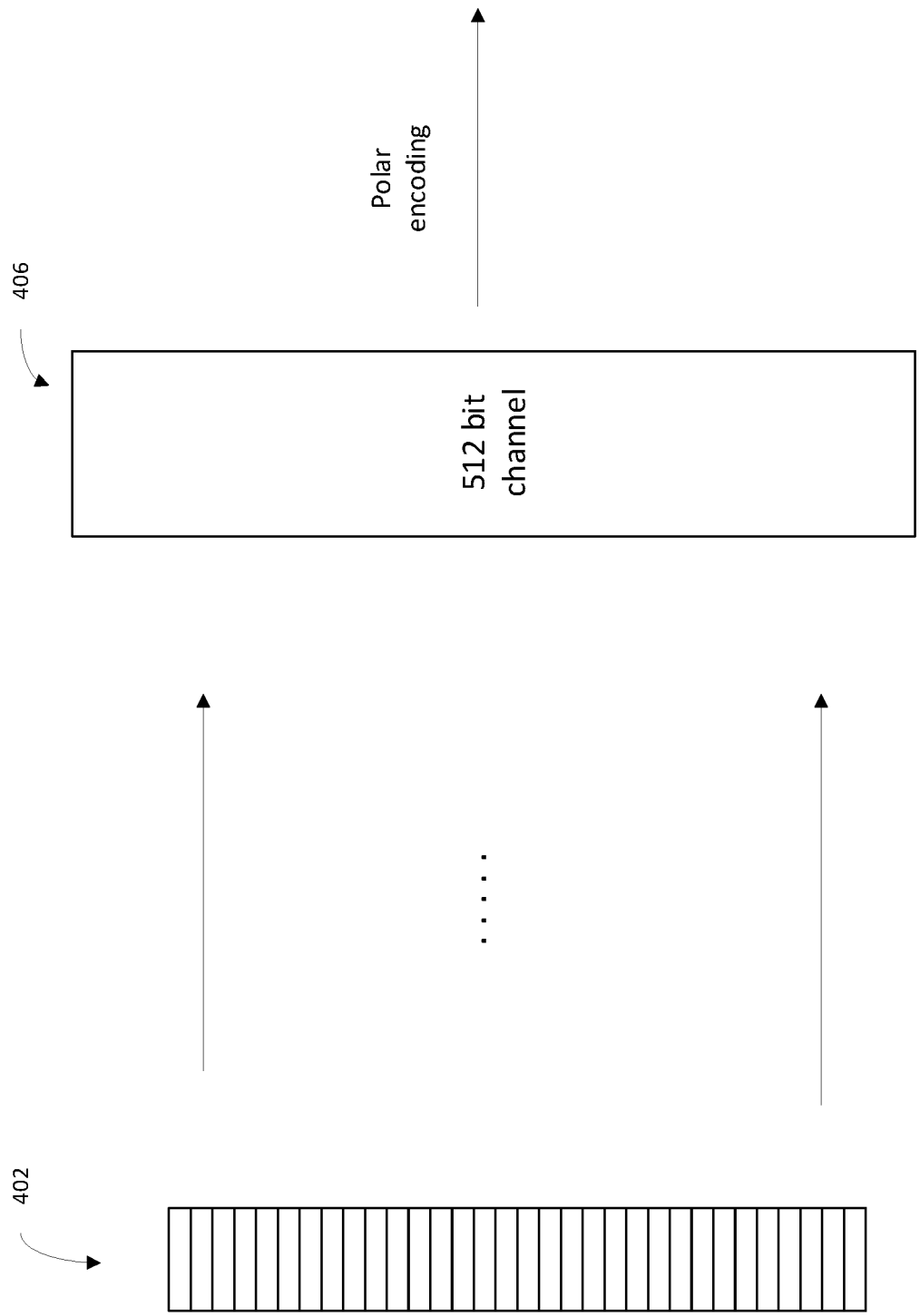

PREDETERMINED MASTER INFORMATION BLOCK CODING

TECHNICAL FIELD

This disclosure relates generally to wireless communications and, more particularly, to systems and methods for coding master information blocks (MIBs) for broadcast.

BACKGROUND

Wireless communications systems are widely deployed to provide various types of communication content such as voice, video, packet data, messaging, broadcast, and so on. A variety of wireless cellular communication systems have been implemented over time, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system.

A communications system may include a number of base stations (BS), each simultaneously supporting communication for multiple communication devices, which may be otherwise known as user equipment (UE). In some cases, such as when a UE is a low cost or low complexity device, a base station may transmit system information in a dedicated system information message. This message may be transmitted in a shared channel without specifying the resources used for transmission in a control channel message. However, without the control channel the UE may have trouble locating the resources used for the system information message.

5G New Radio (NR) systems may include 8 synchronization signal (SS) blocks for lower frequency band communications. The index of these SS blocks may be derived from a demodulation reference signal (DMRS) sequence number. Typically, communications at a higher frequency band may utilize at most 64 SS blocks. However, traditional derivation of time information may relatively difficult at the three least significant bits of a SS block index than at other bits of the SS block index. Hence, traditional derivations of time information may rely upon information from the SS-block other than three lowest significant bits of an SS block.

Currently, certain standards are exploring the use of SS blocks for indicating a broadcast transmission with fields that may include 3 bits for a SS block index, 1 bit for a half frame indicator (5 ms indicator) of a radio frame, and 10 bits for a frame number. Polar code may be applied to broadcast channel coding in the context of a physical downlink control channel (PDCCH). For a receiver (e.g., a decoder), time sensitive information (e.g., SS-block index, half frame indicators and radio frame boundary) may have priority (e.g., a better quality of service) over other information in a broadcast (e.g., a broadcast message or a broadcast signal).

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication node includes: identifying time sensitive bits among a master information block; placing the time sensitive bits at predetermined encoding positions, wherein the time sensitive bits at the predetermined encoding positions are encoded with a common property different than other bits of the master information block; encoding the master information block; and transmitting a broadcast message comprising the master information block.

In a further embodiment, a method performed by a communication device includes: receiving a broadcast message comprising a master information block, wherein the master information block comprises time sensitive bits encoded from predetermined encoding positions, wherein the time sensitive bits at the predetermined encoding positions are encoded with a common property different than other bits of the master information block; and decoding the master information block.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

FIG. 4 is a block diagram that illustrates how bits (including PBCH content and CRC bits) may be mapped to a bit channel in preparation of polar encoding, in accordance with some embodiments of the present disclosure.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
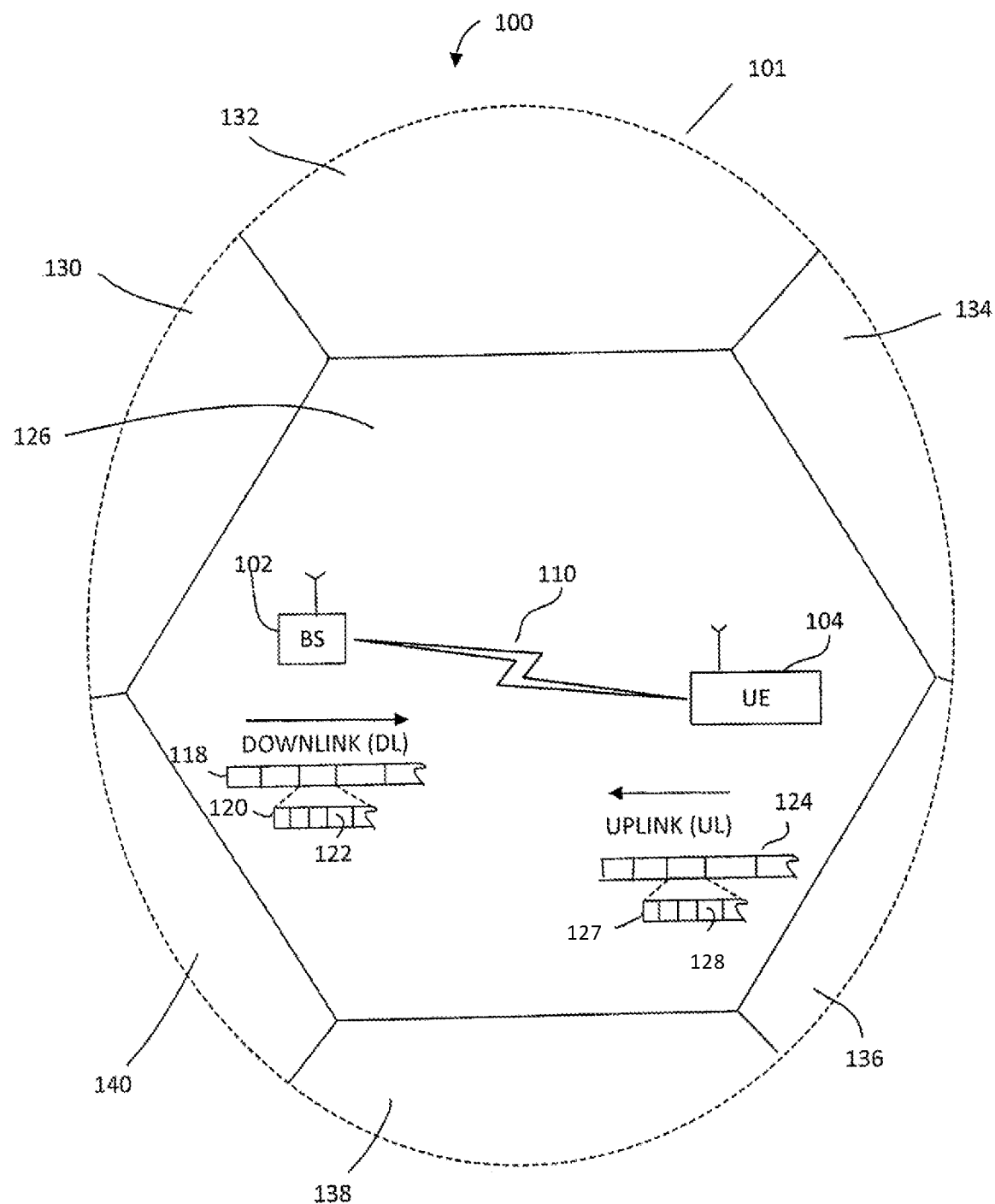
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. A UE 104 may undergo a random access procedure to join the network 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
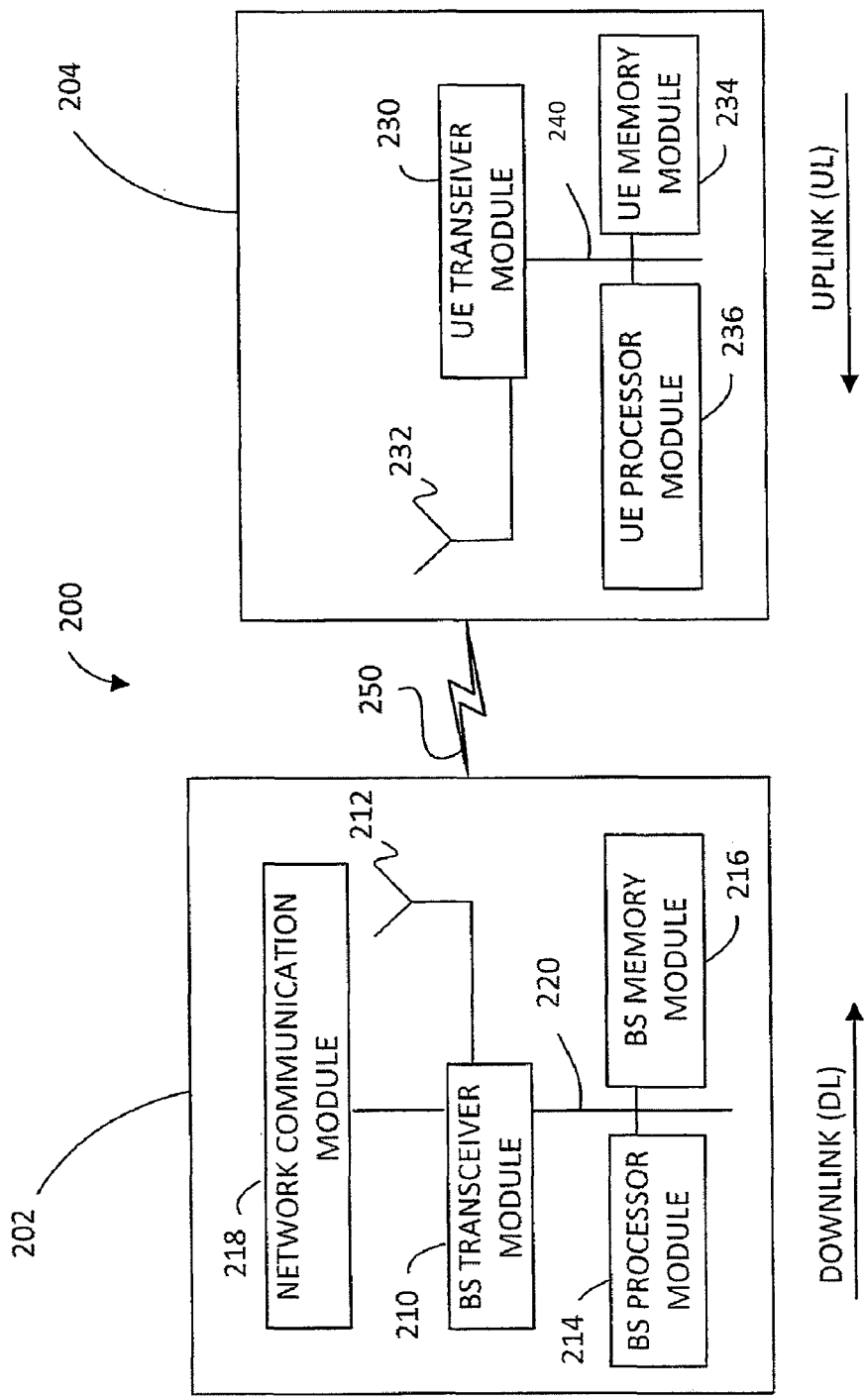
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

The present disclosure provides various embodiments of systems and methods for predetermined master information block (MIB) coding. Predetermined MIB coding may place time sensitive bits of a MIB at encoding locations for decoding with a similar property. This similar property may be, for example, earlier and/or greater accuracy decoding as compared with other bits of an MIB. For example, the time sensitive bits may be placed at initial positions (e.g., locations) of a MIB for earlier decoding. As another example, time sensitive bits may be placed at highest reliability bit channels among bit channels used to encode an MIB. As yet another example, time sensitive bits may be placed at encoding positions for modulation and/or mapping with resource elements (REs) that have same indexes in a frequency domain to that of either a primary synchronization signal or a secondary synchronization signal. Each of these examples will be discussed in further detail below.

Figure 3A:
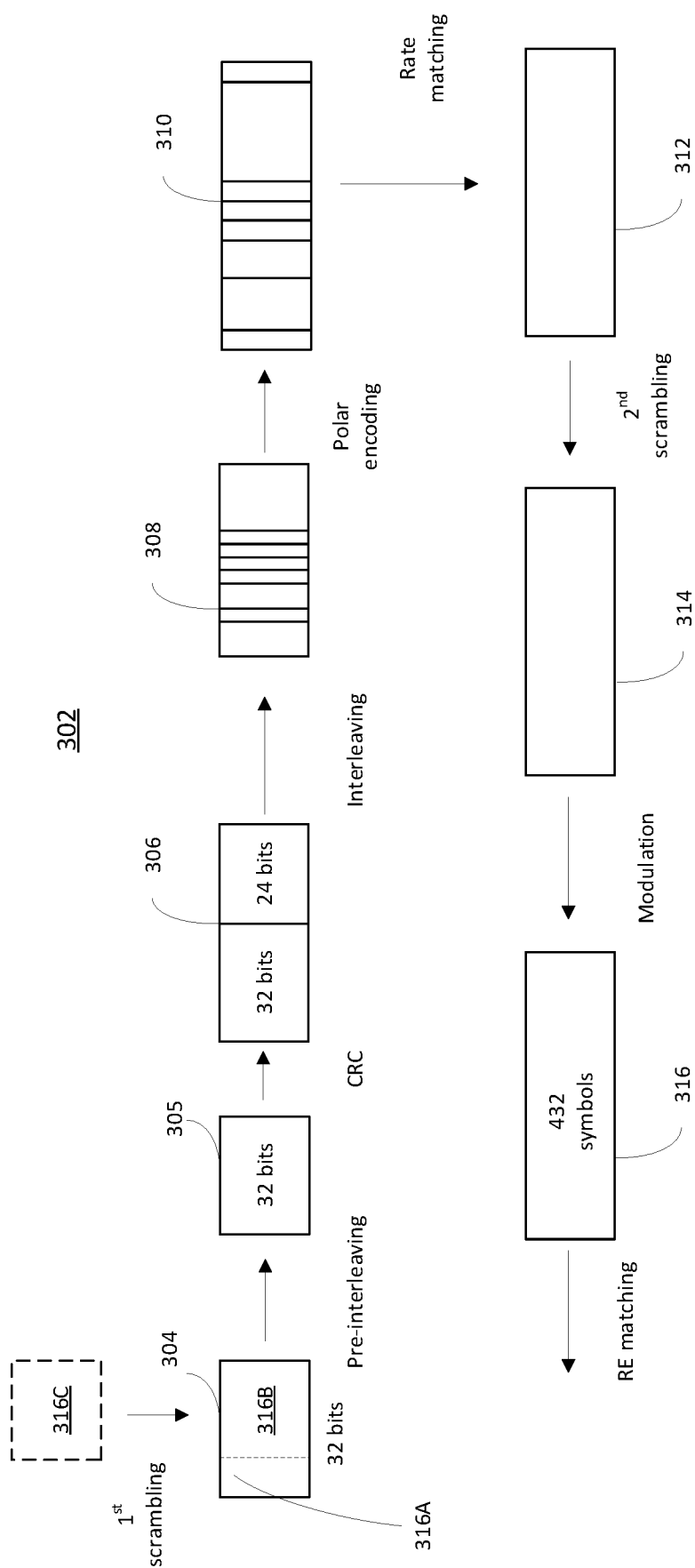
FIG. 3A is a block diagram that illustrates an encoding process within which various embodiments of predetermined master information block (MIB) coding may be performed.

FIG. 3A is a block diagram that illustrates an encoding process 302 within which various embodiments of predetermined master information block (MIB) coding may be performed. For example, an MIB 304 may be 32 bits in size. Arrows illustrate operations and different blocks may illustrate data structures before or after operations. However, in other embodiments, an MIB 304 may be any other number of bits in size, such as 24 bits, and/or may include other types of information with different sizes, such as downlink control information and the like. For part of MIB 304, 316B is not relevant to the 2 or 3 bits LSB of SFN, which may be scrambled with a Gold sequence 316C in a first scrambling. The Gold sequence is a conventional type of sequence used in telecommunications and will not be discussed in detail herein for brevity. The MIB 304 may undergo a pre-interleaving process to produce a pre-interleaved MIB 305. As will be discussed further below, pre-interleaving may be optional in certain embodiments The pre-interleaved MIB 305 may undergo a cyclic redundancy check (CRC) in which bits are added to produce a post CRC MIB 306. For example, 24 CRC bits may be added to the 32 MIB bits to make a total of 56 bits of a post CRC MIB 306. This post CRC MIB 306 may be interleaved in accordance with an interleaving pattern to produce an interleaved MIB 308. The interleaved MIB 308 may undergo polar encoding to produce a polar encoded MIB 310. As will be discussed further below, a 56-bit information bit sequence (e.g., the interleaved MIB 308) may mapped prior to polar coding to 56-bit channels with the highest reliability (for a total of 512 bit channels, where 56 selected bit channels are information bit channels and the rest are frozen bit channels), in certain embodiments. The polar encoded MIB 310 may undergo a rate matching to produce a rate matched MIB 312. The rate matched MIB 312 may undergo a second scrambling (in contrast with the first scrambling, discussed above) to produce a scrambled MIB 314. The scrambled MIB 314 may undergo modulation to produce a modulated MIB 316. The modulated MIB 316 may undergo resource element (RE) matching to produce an RE matched MIB, which may be transmitted using the associated REs. In certain embodiments, the RE matched MIB may have 432 symbols. The encoding process 302 may be performed in accordance with various conventional methodologies, but modified as discussed further below. Accordingly, various aspects of the encoding process 302 are not discussed herein in detail for brevity.

In certain embodiments, pre-interleaving may be optionally utilized to preserve an ordering of bits after later interleaving so that interleaving may not undo a particular ordering of bits. For example, a broadcast message may be pre-interleaved according to pre-interleaving pattern P1: [0, 17, 1, 2, 18, 3, 19, 4, 20, 27, 5, 6, 7, 21, 8, 9, 22, 28, 10, 11, 23, 12, 24, 29, 13, 25, 14, 26, 30, 31, 15, 16]. of MIB before interleaving. Specifically, for example, let M0 be the sequence of MIB before interleaving, M0=[m0, m1, m2, . . . , m31]. Let M1 be the MIB after interleaving. Then, M1(i)=M0(P1(i)), where i is the index and i=0, 1, 2, . . . , 31. For example, M1(0)=M0(0), M1(1)=M0(17), . . . , M1(31)=M0(16). For other communication systems that may use distributed cyclic redundancy checks (D-CRC) polar, the process may be as follows: (1) based on the length of the information bits K (before CRC attachment) and the length of CRC bits Lcrc, calculate the interleaving pattern (denoted by P, where there are K+Lcrc elements in P) that are used to post CRC code bits; (2) remove the number that are bigger than k−1, then the set of the remaining elements of P, called P', is the interleaving pattern for information bits. The interleaving P' used by pre-interleaving may the inverse interleaving of interleaver P after CRC attachment. Stated another way, pre-interleaving may be an inverse of the interleaving applied after CRC attachment. Accordingly, a receiving end may obtain the original message (e.g., message before encoding) without deinterleaving. There are K elements in P'. Accordingly, pre-interleaving may be a type of interleaving with patterns determined as noted above. In certain embodiments, pre-interleaving may be performed before interleaving and may be optional and omitted for an encoding process. For example, when pre-interleaving is optional, CRC bits may be added to the MIB 304 bits to produce a post CRC MIB 306 without pre-interleaving.

The following may be an example of a process of solving (e.g., matching) an interleaving pattern by pre-interleaving when taking K=32 and Lcrc=24: Assuming that the interleaving pattern P to be used after CRC coding is: [0, 2, 3, 5, 7, 10, 11, 12, 14, 15, 18, 19, 21 24, 26, 30, 31, 32, 1, 4, 6, 8, 13, 16, 20, 22, 25, 27, 33, 9, 17, 23, 28, 34, 29, 35, 36, 37, 38, 39, 40, 41, 42, 43, 44, 45, 46, 47, 48, 49, 50, 51, 52, 53, 54, 55]. Also, assuming the sequence A==a0, a1, . . . , a55. Accordingly, the sequence A may be interleaved using the interleaving pattern P to obtain the sequence B=b0, b1, b56, B (i)=A (P (i)), i=0, 1, 2, . . . 55. That is, B (0)=A (0), B (1)=A (2) and so on. Then, removing elements of P greater than 31 gives I=[0, 2, 3, 5, 7, 10, 11, 12, 14, 15, 18, 19, 21, 24, 26, 30, 31, 1, 4, 6, 8, 13, 16, 20, 22, 25, 27, 9, 17, 23, 28, 29]. I can also be used as pre-interleaving interleaved pattern, in this case, MIB sequence M0=m0, m1, . . . , m31. M1 (I (i))=M0 (i), i=0, 1, 2, . . . , 31, where the element in I is an interwoven number number. Furthermore, the elements in I may be sorted from smallest to largest, and the number of the I sequence may be recorded as a pre-interleaving pattern before CRC attachment. For example, after I is sorted, the pre-interleaving pattern P'=[0, 17, 1, 2, 18, 3, 19, 4, 20, 27, 5, 6, 7, 21, 8, 9, 22, 28, 10, 11, 23], where M0 is interleaved using M1(i)=M0(P'(i)), when M1(0)=M0 (0), M1(1)=M0(17), M1(2)=M0(1), M1(3)=M0(2), and so on. P' is the reverse of I.

Stated another way, traditional interleaving may be represented as B (i)=A (P(i)). If you do not sort I, you may get B (P)=A (i). According to the above example we can see that the 0th or 0th, 17 elements in I is the first one after interleaving. That is to say the element number 1 is the 17th element of the original sequence, and so on.

In certain embodiments, the post CRC MIB 306 may be interleaved and mapped onto information bit channels. For example, the 56 bits of the post CRC MIB 306 may be mapped onto a number of bit channels prior to polar coding. Specifically, the 32 bits of the MIB (e.g., bits that carry information) and the 24 bits added for CRC (e.g., bits that are a standard value, such as 0) may be mapped onto information bit channels. The 56 bits may be part of physical broadcast channel (PBCH) content. The 56 bits of the post CRC MIB 306 may be mapped onto the following information bit channels: [247, 253, 254, 255, 367, 375, 379, 381, 382, 383, 415, 431, 439, 441, 443, 444, 445, 446, 447, 463, 469, 470, 471, 473, 474, 475, 476, 477, 478, 479, 483, 485, 486, 487, 489, 490, 491, 492, 493, 494, 495, 497, 498, 499, 500, 501, 502, 503, 504, 505, 506, 507, 508, 509, 510, 511].

Also, as discussed above, after CRC attachment, a post CRC MIB 306 may be interleaved in accordance with an interleaving pattern. This interleaving may be performed upon the post CRC MIB 306 and be mapped with the above discussed information bit channels. For example, the following interleaving pattern P2 may be utilized: [0, 2, 3, 5, 7, 10, 11, 12, 14, 15, 18, 19, 21, 24, 26, 30, 31, 32, 1, 4, 6, 8, 13, 16, 20, 22, 25, 27, 33, 9, 17, 23, 28, 34, 29, 35, 36, 37, 38, 39, 40, 41, 42, 43, 44, 45, 46, 47, 48, 49, 50, 51, 52, 53, 54, 55].

In various embodiments, pre-interleaving may be performed so that a decoder of a broadcast (e.g. a PBCH), such as a UE, may obtain an original MIB (e.g., an MIB with a particular original ordered arrangement of bits) after polar decoding without further deinterleaving. This may be desirable as the decoder of a broadcast may then judge whether the decoding is successful earlier than if the further deinterleaving were performed. Also, the interleaving pattern (e.g., for interleaving or pre-interleaving) may be chosen based upon a rationale that it makes no difference to the outcome of decoding whether the time related content (e.g., time sensitive bits) are earlier (e.g., with lower index values) or later (e.g., with higher index values) in the order of bits. But the time related content, or time sensitive bits, may be important to the functioning of the UE. For example, a receiver may determine whether decoding is successful using time related content, or time sensitive bits. This determination may be based on the location of the synchronization signal (SS) block. Hence, time sensitive bits of an MIB may be placed ahead of other MIB bits in a broadcast message.

Accordingly, pre-interleaving may facilitate the placement of time-sensitive bits in a particular ordered arrangement of bits so that further processing of the particular order of the time-sensitive bits are not frustrated by later interleaving or other processing. An ordered arrangement of bits may refer to a sequence of bits (e.g., a linear sequence, where bits are in sequential order and earlier bits have a lower index value). This ordered arrangement of bits may be relevant to a mapping of bits (e.g., MIB bits) after CRC attachment and interleaving to bit channels (e.g., information bit channels mapped to MIB bits). As discussed above, the bits input into the CRC encoder may be pre-interleaved MIB bits (e.g., the pre-interleaved MIB 305). By pre-interleaving, the order of the MIB 304, and specifically the time sensitive bits of the MIB 304, may not be disturbed (e.g., put out of order), for example when mapping to information bit channels.

With reference to the above discussion of the encoding process 302, the MIB bits may be arranged in a ordered arrangement, and then interleaved before, or as part of, mapping to information bit channels. In decoding, a receiving side may perform the operations of encoding in reverse.

In certain embodiment, an ordered arrangement of bits may place time sensitive bits before other bits of a MIB. For example, the time sensitive bits 316A of an MIB 304 may be placed before the other bits 316B of the MIB that are not time sensitive. In this manner, the time sensitive bits 316A may be decoded prior to other bits 316B of the MIB 304. Examples of time sensitive bits 316A may include, for example, half frame indicator bits, most significant three bits of a synchronization signal block field, least significant three bits of a system frame number field, and most significant seven bits of a system frame number field.

In various embodiments, the other bits 316B of the MIB 314 may be scrambled via a first scrambling (in contrast with a second scrambling, as discussed above). Scrambling (e.g. first scrambling or second scrambling) does not change the length or order of a sequence, but only changes the value of the element in the scrambled sequence. Block 316C in FIG. 3A shows the scrambling code sequence—a Gold Sequence—used to scramble bits of an MIB, with the exception for 2 or 3 least significant bits of the SFN of the MIB.

In a particular embodiment, an ordered arrangement of bits may place time sensitive bits in the following order: half frame indicator bits, followed by three most significant bits of the SS block, followed by least significant three bits of a system frame number (SFN), followed by the most significant seven bits of a SFN, and followed by the other bits of an MIB. In certain embodiments, these time sensitive bits (e.g., time related information) may be a total of 10 bits of a SFN is [s9 s0], a half-frame indication one bit is denoted by c0, and the SS block index's three most significant bits are represented as [b5, b4, b3]. Alternatively, in another particular embodiment, an ordered arrangement of bits may place time sensitive bits in the following order: half frame indicator bits, followed by three most significant bits of the SS block, followed by the most significant seven bits of a SFN, followed by least significant three bits of a system frame number (SFN), and followed by the other bits of an MIB. In certain embodiments, a receiver or UE may receive all of the information that the UE needs to communicate with a BS (e.g., all of the important information) after decoding the half frame indicator and the least significant three bits of a SS block index. In certain embodiments, the ordering of bits may be three least significant bits of a SFN, followed by a half frame indicator, followed by three most significant bits of an SS block, followed by seven most significant bits of a SFN (e.g., s2, s1, s0, c0, b5, b4, b3, s9, s8, . . . s3). In particular embodiments, the ordering of bits may be third and second least significant bits of a SFN, followed by bits of a SS block, followed by a half frame indicator, followed by first least significant bit 1st LSB and seven most significant bits of a SFN (e.g., s2, s1, b5, b4, b3, c0, s0, s9, s8, s3).

In another particular embodiment, an ordered arrangement of bits may place time sensitive bits in the following order: half frame indicator bits, followed by least significant three bits of a SFN, followed by three most significant bits of an SS block, followed by the most significant seven bits of the SFN, and followed by the other bits of an MIB. The other bits of the MIB may be in the following order: DMRS indicator bits, followed by cell barred flag bits, followed by RMSI bits, followed by PRB offset bits, followed by reserved bits.

In yet another particular embodiment, an ordered arrangement of bits may place time sensitive bits in the following order: half frame indicator bits, followed by least significant three bits of a SFN, followed by three most significant bits of an SS block, followed by RMSI bits, followed by a DMRS indicator bits, followed by a cell barred flag, followed by the most significant seven bits of the SFN, and followed by the other bits of an MIB.

In another particular embodiment again, an ordered arrangement of bits may place time sensitive bits in the following order: least significant three bits of a SFN, followed by three most significant bits of an SS block, followed by half frame indicator bits, followed by RMSI bits, followed by a DMRS indicator bits, followed by a cell barred flag, followed by PRB offset bits, followed by the most significant seven bits of the SFN, and followed by the other bits of an MIB.

In another yet particular embodiment again, an ordered arrangement of bits may place time sensitive bits in the following order: 10 bits of an SFN, followed by four bits of reserved bits, followed by a field indication, followed by three most significant bits of an SS block index. As another embodiment, an ordered arrangement of bits may place time sensitive bits in the following order: MIBs other than the time sensitive bits (e.g., time related information) may be preceded by a ten bit SFN, followed by a half frame indicator, followed by three most significant bits of an SS block index. As yet another embodiment, an ordered arrangement of bits may place time sensitive bits in the following order: a ten bit SFN, followed by a field indicator, followed by three most significant bits of an SS block index, followed by four bits of reserved bits, followed by the remaining MIB bits.

In yet another particular embodiment again, an ordered arrangement of bits may place time sensitive bits in the following order: the most significant seven or six bits of an SFN, followed by a DMRS indicator bits, followed by a cell barred flag, followed by reserve bits, followed by least significant three, two, or one bits of a SFN, followed by C0 bits (e.g., half radio frame indicator bits), followed by RMSI bits, followed by SS block bits, followed by the other bits of an MIB.

In certain embodiments, information that may be less time sensitive may be placed in bit locations of lower reliability (e.g., lowest reliable bit encoding locations).

In certain embodiments, where the following numerals reference a bit channel (e.g., a bit channel index value, indexed from 0), a half frame indicator may be placed (e.g., located or associated) at [247], a SS-block index may be placed at [253, 254, 255], a SFN may be placed at [367, 375, 379, 381, 382, 383, 415, 431, 439, 441], a demodulation reference signal (DMRS) indicator (or, alternatively, a cell barred flag) may be placed at [443], a remaining minimum system information (RMSI) may be placed at [444, 445, 447, 463, 469, 470, 471, 473], a physical resource block (PRB) offset may be placed at [474, 475, 476, 477], reserved bits may be placed at [479, 483, 485, 486] and a cell bared flag may be placed at [489]. With this order or arrangement of bits, the time stamp (e.g., time sensitive information) may be obtained by the first CRC check (mapped to a 446 bit channel). By the second CRC check (mapped to a 478 bit channel), the RMSI and PRB offset information may be obtained. By the third CRC check (mapped to a 487 bit channel), the reserved information may be obtained, with the fourth CRC check (mapped to a 490 bit channel), the cell bared information may be obtained. The remaining 20 CRC bits may be finally decoded to verify the entire MIB.

In certain embodiments, an ordering of bits may include: three least significant bits for a SFN at [247, 253, 254], followed by an SS block index on [255, 367, 375], a half frame indication at [379], seven most significant bits for the SFN at [381, 382, 383, 415, 431, 439, 441]. In various embodiments, an ordering of bits may include: third and second least significant bits of a SFN at [247, 253], followed by an SS block index at [254, 255, 367], followed by a half frame indicator at [375], followed by a first least significant bit and seven most significant bits of a SFN at [379, 381, 382, 383, 415, 431, 439, 441].

In particular embodiments, for a mapping process after CRC attachment and interleaving, 56-bits of an interleaved MIB 308 may be represented as b0 to b55. For a broadcast channel, the length of a mother code may be 512×512 bit channels, which may be noted as U=u0~u511. Also, polar encoding, b0~b55 may be mapped to the most reliable bit channel, as represented by: [u247, u253, u254, u255, u367, u375, u379, u381, u382, u383, u415, u431, u439, u441, u443, u444, u445, u446, u447, u463, u469, u470, u471, u473, u474, u475, u476, u477, u478, u479, u483, u485, u486, u487, u489, u490, u491, u492, u493, u494, u495, u497, u498, u499, u500, u501, u502, u503, u504, u505, u506, u507, u508, u509, u510, u511].

Figure 3B:
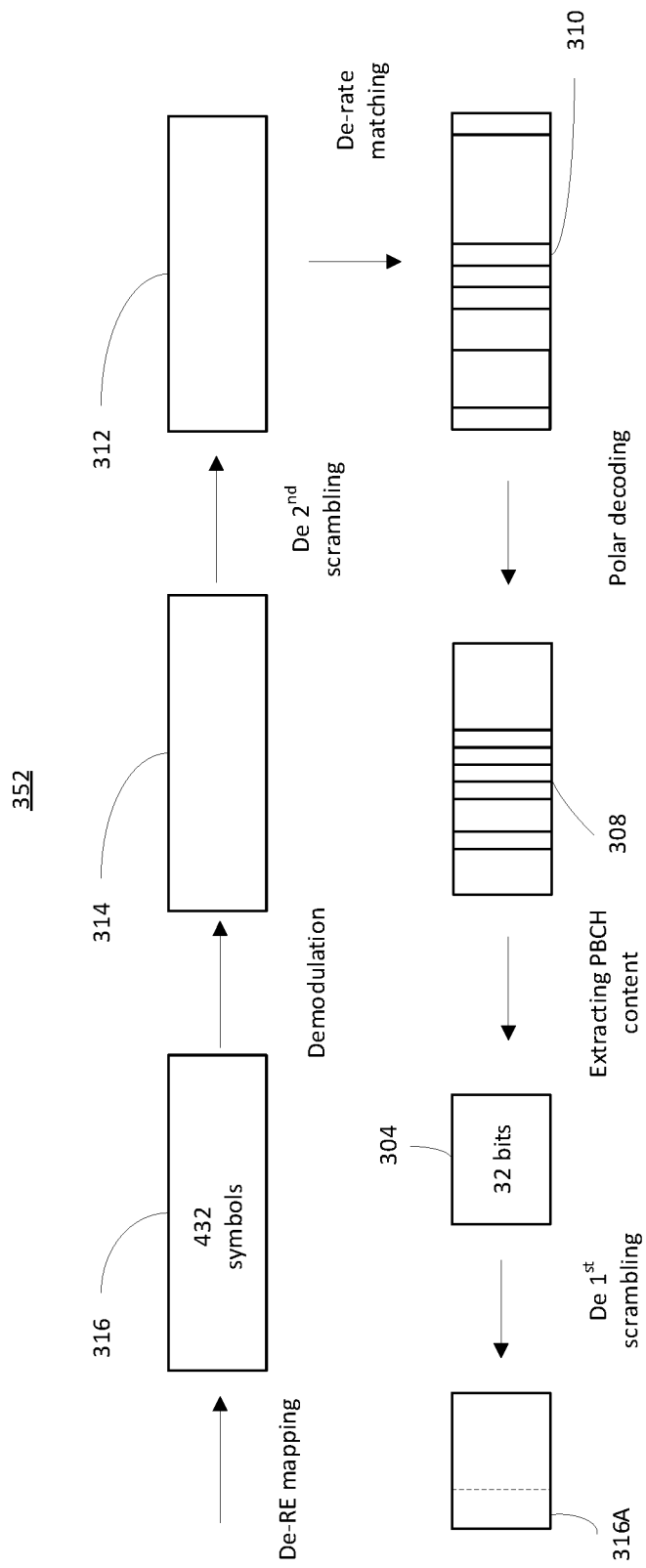
FIG. 3B is a block diagram that illustrates a decoding process within which various embodiments of predetermined master information block (MIB) coding may be performed.

FIG. 3B is a block diagram that illustrates a decoding process 352 within which various embodiments of predetermined master information block (MIB) coding may be performed. As noted above, in decoding, a receiving side (e.g., a decoder or a UE) may perform the operations of encoding in reverse. The term "de" may refer to a reverse operation (e.g., reverse of an operation). At the receiving side (e.g., at a UE), REs (discussed further above in connection with FIG. 3A), may be de-RE mapped to produce a modulated MIB 316. The modulated MIB 316 may be demodulated to produce the scrambled MIB 314. The scrambled MIB 314 may be de second scrambled to produce a rate matched MIB 312. The rate matched MIB 312 may be de-rate matched to produce the polar encoded MIB 310. The polar encoded MIB 310 may be polar decoded to produce the interleaved MIB 308. PBCH content may be extracted from the interleaved MIB 308 (e.g., by de-interleaving, removing the added CRC bits, and de-pre-interleaving) to produce an MIB 304. As discussed above with reference to FIG. 3A, the MIB 304 may be partitioned into time sensitive bits 316A of the MIB 304 that may be placed before the other bits 316B of the MIB that are not time sensitive. The bits of the MIB 304 may have undergone a first scrambling. Accordingly, with reference to FIG. 3B, the MIB 304 may be de first scrambled to produce both time sensitive bits 316A and other bits of the de first scrambled MIB. The decoding process 352 may be performed in accordance with various conventional methodologies, but modified as discussed herein. Accordingly, various aspects of the encoding process 352 are not discussed herein in detail for brevity.

FIG. 4 is a block diagram that illustrates how a bits 402 may be mapped to a bit channel 406 in preparation for polar encoding, in accordance with some embodiments of the present disclosure. As introduced above, non-information bit channels may be frozen bit channels (e.g., without information) and their corresponding value may be set to zero. For example, these frozen bit channels may be mapped to CRC bits. Polar encoding may be performed after the bit channel mapping is completed (e.g., with reference to FIG. 3A above, after bits of a post CRC MIB 306 are mapped to bit channels). The polar encoding process may be represented as C=U*G, where C is a polar encoded encoding bit vector, C=c0, c1, ..., c511, U=u0, u1, ..., u511, and G is a matrix of 512×512.

As introduced above, an interleaving pattern, such as P2 discussed above, may be utilized for interleaving in embodiments where there is an interleaving process before polar coding. However, in these embodiments with interleaving, the precise order of the an ordered arrangement of bits may be disrupted by the interleaving. For example, a precise order of an ordered arrangement of time sensitive bits ordered as: an SFN at s9~s0, followed by a half frame indicator c0, and followed by three most significant bits of an SS-block at b5~b3 may are all be consecutively placed, and their order may be disrupted by interleaving. As introduced above, this interleaving may occur after CRC attachment and before encoding of all PBCH content. In various embodiment, as discussed above, decoding may be performed in a reverse order of encoding in order to process the information bits of an MIB.

In a variety of embodiments, time sensitive bits of a MIB may be placed at predetermined encoding positions that interface with high reliability bit channels among a set of bit channels used to encode the MIB. These high reliability bit channels may be the bit channels with the highest reliability (e.g., lowest error rate) among the set of bit channels used to encode the MIB. These high reliability bit channels may be predetermined, such as by knowing which bit channels have a particular degree of reliability (such as a highest reliability) among various bit channels. As noted above, these bit channels may be utilized to encode CRC bits (e.g., CRC check bits) after an MIB has been CRC encoded.

In certain embodiments, time sensitive bits may be bits that change with a certain regularity. Such content that changes with certain regularity may be interfaced with a last channel (e.g., channel 512), which may be a channel of high reliability. Examples of such time sensitive bits that change with a certain regularity may be c0 (e.g., a half frame indicator) or certain less significant bits of an SFN (e.g., s0 or s1 or s2 bits of an SFN) and the like. Upon decoding, a receiver may decode the last bit (e.g., encoded upon channel 512) and utilize the time sensitive information from the last bit to determine whether the decoded message has been properly decoded, or perform other time based functions based on the decoded time sensitive information. In certain embodiments, highest reliability bit channels may be mapped to the last positions for bits within an MIB. Accordingly, time sensitive bits may be placed at these last positions for bits within the MIB.

In certain embodiments, a half frame indicator C0 may not have to participate in a CRC check if placed at bit channel 512. For example, when a PBCH is encoded, the CRC attachment may use 31 payload bits before polar encoding, where the CRC bits may be encoded together with the information bit on channel 512. Although channel 512 is specifically discussed herein, encoding on other bit channels may also avoid participation in a CRC check in other CRC configurations or other distributed CRC polar configurations (D-CRC polar). In certain embodiments, CRC computation with D CRC polar encoding may require participation of all information (e.g., bits) and thus no information encoded channels may avoid participation in CRC check.

In certain embodiments, a bit placed at bit channel 512 can also participate in CRC attachment. For example, such a bit may be placed with a frozen bit channel (in contrast with an information bit channel) before being CRC encoded together with the rest of the information bits.

In particular embodiments, when half frame indicator c0 is mapped to bit channel 512, half frame indicator c0 may be specifically part of CRC attachment by being mapped to bit channels [18, 29 and 34] after interleaving along with the CRC check locations (e.g., locations of CRC bits) of the D-CRC polar. The other 21 CRC check bits may be from 36 to 56 (e.g., index values of 36 to 56) respectively.

For example, in certain embodiments, the following bit channels may be utilized to interface with a post CRC MIB of 56 bits as the 56 most reliable channels (starting from 1): [1, 3, 4, 6, 8, 11, 12, 13, 15, 16, 19, 20, 22, 25, 27, 31, 32, 33, 2, 5, 7, 9, 14, 17, 21, 23, 26, 28, 34, 10, 18, 24, 29, 35, 30, 36, 37, 38, 39, 40, 41, 42, 43, 44, 45, 46, 47, 48, 49, 50, 51, 52, 53, 54, 55, 56]. As yet another example, the following bit channels may be utilized to interface with a post CRC MIB of 56 bits as the 56 most reliable channels: [248, 254, 255, 256, 368, 376, 380, 382, 383, 384, 416, 432, 440, 442, 444, 445, 446, 447, 448, 464, 470, 471, 472, 474, 475, 476, 477, 478, 479, 480, 484, 486, 487, 488, 490, 491, 492, 493, 494, 495, 496, 498, 499, 500, 501, 502, 503, 504, 505, 506, 507, 508, 509, 510, 511, 512]. As a further example, the following bit channels may be utilized to interface with a post CRC MIB of 56 bits with 57 of the most reliable channels: [248, 254, 255, 256, 368, 376, 380, 382, 383, 384, 416, 432, 440, 442, 443, 444, 445, 446, 447, 448, 464, 470, 471, 472, 474, 475, 476, 477, 478, 479, 480, 484, 486, 487, 488, 490, 491, 492, 493, 494, 495, 496, 498, 499, 500, 501, 502, 503, 504, 505, 506, 507, 508, 509, 510, 511, 512], where compared to the example immediate prior, channel 443 is an additional channel added to make the set of 57 most reliable channels.

In particular embodiments, a half frame indicator may be used for determining a radio frame boundary (e.g., be time sensitive information, or of a time sensitive bit). Thus, the half frame indication may be placed at channel 512 (e.g., a high reliability bit channel). Because, in certain embodiments, other bit channels have no impact on channel 512 (e.g., do not overlap in resource elements) and the broadcast is quadrature phase shift keying (QPSK) modulated, the receiving side (e.g., decoder) may decode the half frame indication bit at channel 512 directly (e.g., without going through an CRC check). In addition, in particular embodiments, a time order of bits (e.g., a bit order) may not make a difference to a decoding outcome. However, the time order of bits may be useful for a receiver, such as a UE, that is performing decoding as the bit order may dictate when certain bits are decoded. Accordingly, certain time sensitive bits may be placed at encoding locations that may be decoded sooner than other encoding locations. For example, certain time sensitive bits may be placed ahead of other bits.

In certain embodiments, if there are more bit channels in a set of bit channels than bits to be interfaced with the bit channels, all of the bits may be encoded via matching with the set of bit channels. For example, if there are 17 bit channels and only 14 bits to interface with the 17 bit channels, all 14 bits may be interfaced with the 17 bit channels.

In certain embodiments, the following 57 bit channels may interface with 56 bits, where bits with underlining are part of a frozen bit channel and bits without highlighting are part of an information bit channel (discussed further above): [238, 254, 255, 256, 368, 376, 380, 382, 383, 384, 416, 432, 440, 442, 443, 444, 445, 446, 447, 448, 464, 470, 471, 472, 474, 475, 476, 477, 478, 479, 480, 484, 486, 487, 488, 490, 491, 492, 493, 494, 495, 496, 498, 499, 500, 501, 502, 503, 504, 505, 506, 507, 508, 509, 510, 511, 512]. Here, most significant three bits of a SS block may correspond to channels [238, 254, 255], the half frame indicator c0 may corresponds to channel 256, the least significant three bits of SFN may correspond to channels [368, 376, 380], seven most significant bits of an SFN may correspond to channels [382, 383, 384, 416, 432, 440, 442}, a RMSI may correspond to channels [443, 444, 445, 447, 448, 464, 470, 471], with other fields of an MIB, such as a DMRS indicator, cell bare flag, reserved bits and the like mapped to other bit channels.

In certain embodiments, a last bit of data in a combinable block of data (e.g., closest to separation symbols of combined blocks of data) may be combined with other blocks of data earlier than other bits of data in the combinable block of data. For example, a last bit of data in a block of data may be combined first to other blocks (as it may be adjacent to a separation symbol). In various embodiments, this last bit of data in a block of data may be associated with a bit channel, such as bit channel 512. In certain embodiments, this last bit of data in a block of data may be related to information such as a half frame indicator c0.

In certain embodiments, at a low frequency band, an S S-block index may be determined from a sequence of a DMRS. Then, making use of a half frame indicator and SS-block index, SFN values may be determined and decoded accordingly. In particular embodiments, at a high frequency band, a receiver may decode the least significant three bits of an SS block index. Based on the least significant three bits of an SS block index, the receiver may decode the symbols on bit channel 512 to obtain a half frame indicator. Then, the relative location of the most significant three bits of an SS block index may be determined based on the location of the SS block index. Furthermore, the least significant three bits of an SFN may also be determined based on the location of the SS block index and the half frame indicator. In certain embodiments, corresponding bit positions may be reversed for decoding.

In additional embodiments, most significant three bits of an SS block index may be placed at bit channels [248, 254, 255], a SFN at bit channels [256, 368, 376, 380, 382, 383, 384, 416, 432, 440], a DMRS indicator at bit channel [442], a half frame indicator at bit channel [443], RMSI at bit channels [444, 445, 447, 448, 464, 470, 471, 472], a PRB offset at bit channels [474, 475, 476, 477], reserved bits at bit channels [479, 480, 484, 486], a cell bared flag at bit channel [488], and check bits and/or half frame indicator at bit channel [512]. Alternatively, a least significant bit of a SFN (or a second least significant bit of a SFN) may be placed at bit channel [512]. For instance, an S2 bit of an SFN may be placed at bit channel 512.

Figure 5:
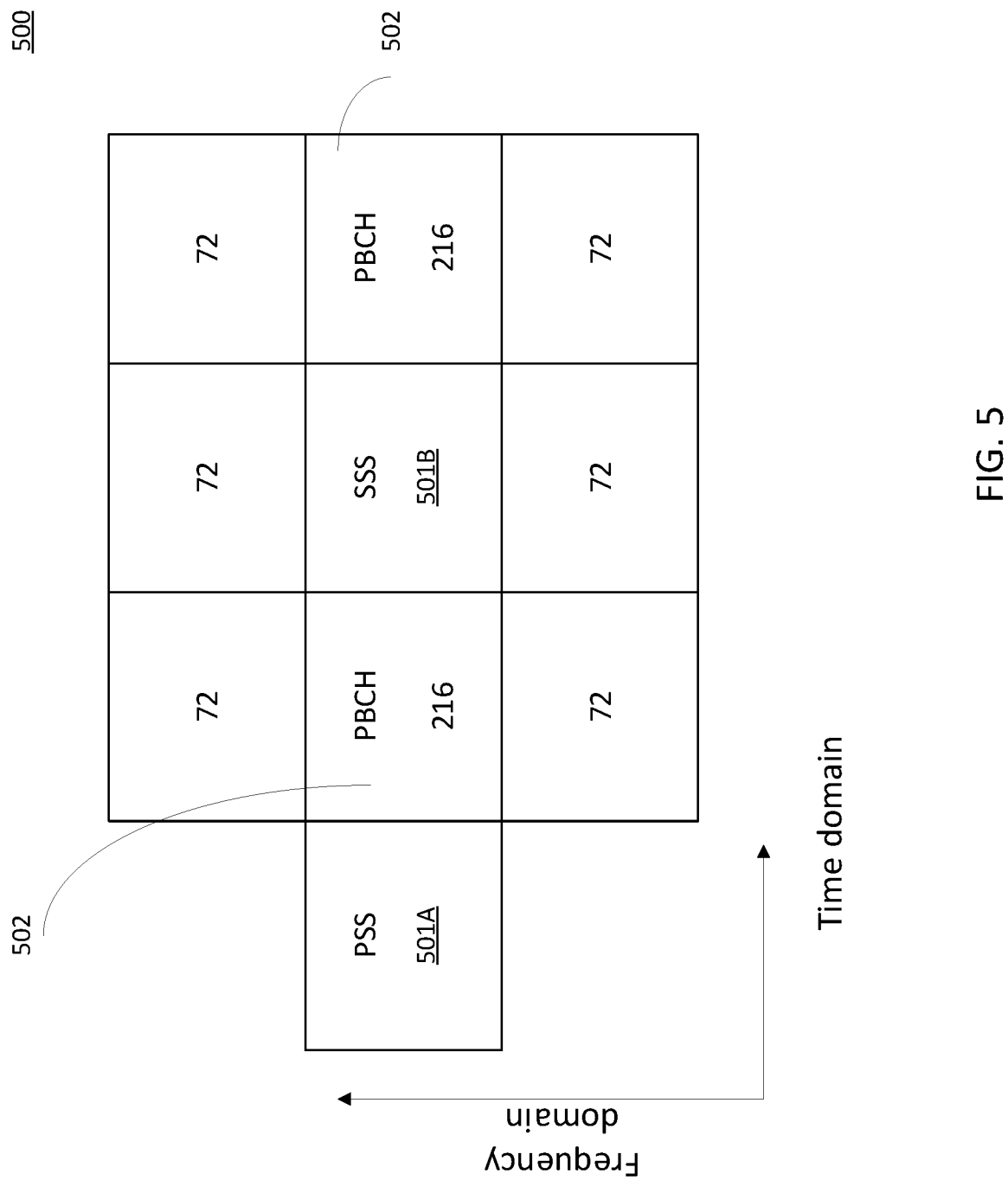
FIG. 5 is a resource grid that illustrates how predetermined encoding positions may have bits matched (e.g., modulated and mapped) with resource elements that have same frequency domain indexes with either a primary synchronization signal or a secondary synchronization signal, in accordance with some embodiments of the present disclosure.

FIG. 5 is a resource grid 500 that illustrates how predetermined encoding positions may have bits be matched (e.g., modulated and mapped) with resource elements that have a same frequency domain index as either a primary synchronization signal 501A (PSS) or a secondary synchronization signal 501B (SSS), in accordance with some embodiments of the present disclosure. The resource grid 500 may be plotted across the frequency and time domains. For example, time sensitive bits, which include time sensitive information, may be placed at predetermined bit encoding locations that may be matched or mapped to resource elements (REs) that have a same frequency domain index as the PSS 501A or the SSS 501B. In the resource grid 500, these time sensitive bits may be placed to match with one of the resource elements at particular PBCH resource blocks 502 that shares a common frequency domain index with a PSS 501A or SSS 501B. Stated another way, the PBCH may be mapped according to an order in which certain resource elements are mapped to time sensitive bits. For example, with a mother code length of 512, two PBCH resource blocks 502 of 216 bits may have a common a frequency domain index with a PSS or a SSS. In total there may be 432 bits that utilize such resources, calculated as 216 (bits)*2 (number of resource blocks)=432 bits across both PBCH resource blocks 502. In certain embodiments, bits with indexes 297-512 may be mapped to symbols on a broadcast channel with a same frequency as that associated with a PSS or SSS.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication node, the method comprising:
   identifying time sensitive bits among a master information block;
   placing the time sensitive bits at predetermined encoding positions, wherein the time sensitive bits at the predetermined encoding positions are encoded with a common property different than other bits of the master information block;
   encoding the master information block; and
   transmitting a broadcast message comprising the master information block,
   wherein the predetermined encoding positions are initial positions of the master information block, and
   wherein an order of the time sensitive bits differs when physical broadcast channel (PBCH) signals are carried within each different frequency bands.

2. The method of claim 1, wherein the time sensitive bits are ordered as: three least significant bits or third and second least significant bits of a system frame number bits field, followed by three most significant bits of a synchronization signal block index, followed by half frame indicator bits, and followed by most significant seven or eight bits of a system frame number field.

3. The method of claim 1, wherein the time sensitive bits are ordered as: half frame indicator bits, followed by most significant three bits of a synchronization signal block field, followed by ten bits of a system frame number field.

4. The method of claim 1, wherein for encoding using a high frequency band, the time sensitive bits are ordered as: least significant two or three bits of a system frame number field, followed by most significant three bits of a synchronization signal block index field, followed by half frame indicator bits, and followed by most significant eight or seven bits of the system frame number field, wherein for encoding using a low frequency band, the time sensitive bits are ordered as: the most significant three bits of the synchronization signal block index field, followed by the half frame indicator bits, and followed by the system frame number field.

5. The method of claim 1, wherein the predetermined encoding positions are final positions of the master information block, wherein the time sensitive bits are ordered as: seven most significant bits of a system frame number field, followed by reserved bits, followed by three least significant bits for the system frame number field, followed by a half field indication field, followed by three most significant bits of a SS block index field.

6. The method of claim 1, further comprising performing distributed cyclic redundancy check polar encoding, wherein the distributed cyclic redundancy check polar encoding comprises pre-interleaving information bits before cyclic redundancy check encoding.

7. The method of claim 1, further comprising pre-interleaving the master information block before cyclic redundancy check (CRC) attachment with a pre-interleaving pattern of P1=[0, 17, 1, 2, 18, 3, 19, 4, 20, 27, 5, 6, 7, 21, 8, 9, 22, 28, 10, 11, 23, 12, 24, 29, 13, 25, 14, 26, 30, 31, 15, 16], wherein the pre-interleaving pattern of P1 refers to an order of physical broadcast channel (PBCH) contents before interleaving.

8. The method of claim 7, wherein the pre-interleaving is an inverse of the interleaving applied after cyclic redundancy check (CRC) attachment.

9. The method of claim 1, wherein the predetermined encoding positions interface with highest reliability bit channels among a bit channel set used to encode the master information block.

10. The method of claim 1, wherein the time sensitive bits are associated with highest reliability bit channels and are mapped in resource elements (REs) that have same indexes in a frequency domain to that of either a primary synchronization signal or a secondary synchronization signal.

11. The method of claim 1, wherein the time sensitive bits are at least one of: a half frame indicator bits, most significant three bits of a synchronization signal block index field, least significant three bits of a system frame number field, and most significant seven bits of the system frame number field.

12. A method performed by a communication device, the method comprising:
    receiving a broadcast message comprising a master information block, wherein the master information block comprises time sensitive bits encoded from predetermined encoding positions, wherein the time sensitive bits at the predetermined encoding positions are encoded with a common property different than other bits of the master information block; and
    decoding the master information block,
    wherein the predetermined encoding positions are initial positions of the master information block, and
    wherein an order of the time sensitive bits differs when physical broadcast channel (PBCH) signals are carried within each different frequency bands.

13. The method of claim 12, further comprising polar decoding if the broadcast message is transmitted using pre-interleaving.

14. The method of claim 12, further comprising:
    making a pre-judgement on a decoding result when the broadcast message is a combination of two SS block broadcast signals, wherein the pre judgement is made according to a least significant bit information of a system frame number; and
    terminating decoding if a decoding failure is detected.

15. The method of claim 12, wherein the predetermined encoding positions are initial positions of the master information block.

16. The method of claim 12, wherein the broadcast message is transmitted using a physical broadcast channel (PBCH).

17. A computing device configured to carry out the method of claim 1.

18. A computing device configured to carry out the method of claim 12.

* * * * *